May 26, 1970 R. O. GUNDERSON ET AL 3,514,641

HOLDOVER CIRCUIT

Original Filed Jan. 18, 1965

INVENTORS
ROBERT O. GUNDERSON
SIDNEY L. VALENTINE
MARTIN H. JURICK
PAUL HIGASHI

BY Louis A. Kline
John J. Matlago
Richard J. Rengna
THEIR ATTORNEYS

United States Patent Office 3,514,641 Patented May 26, 1970

3,514,641
HOLDOVER CIRCUIT

Robert O. Gunderson, Sidney L. Valentine, and Martin H. Jurick, Torrance, and Paul Higashi, Gardena, Calif., assignors to The National Cash Register Company, Dayton, Ohio, a corporation of Maryland Original application Jan. 18, 1965, Ser. No. 426,105, now Patent No. 3,426,328, dated Feb. 4, 1969. Divided and this application Oct. 24, 1968, Ser. No. 770,286
Int. Cl. H03k *17/26*
U.S. Cl. 307—293 4 Claims

ABSTRACT OF THE DISCLOSURE

A logical circuit having true and false output stages has a "normal" output condition wherein the true and false output stages are respectively at complementary high and low signal levels if the input line to the logical circuit is at its high binary signal level. When a signal input pulse puts the input line at its low binary signal level, then the complementary signal levels of the true and false output stages will invert in signal level for a predetermined period of time and then revert to their normal condition level outputs. The predetermined time period is adjustable through an RC network having an adjustable resistor and a Zener controlled voltage circuit. The precision of the timing period is made certain and definite by use of a positive feedback circuit from the false output stage to the input of a transistor in a differential amplifier which "triggers on" the transistor when its input reaches the critical threshold level.

Figures 1, 2:
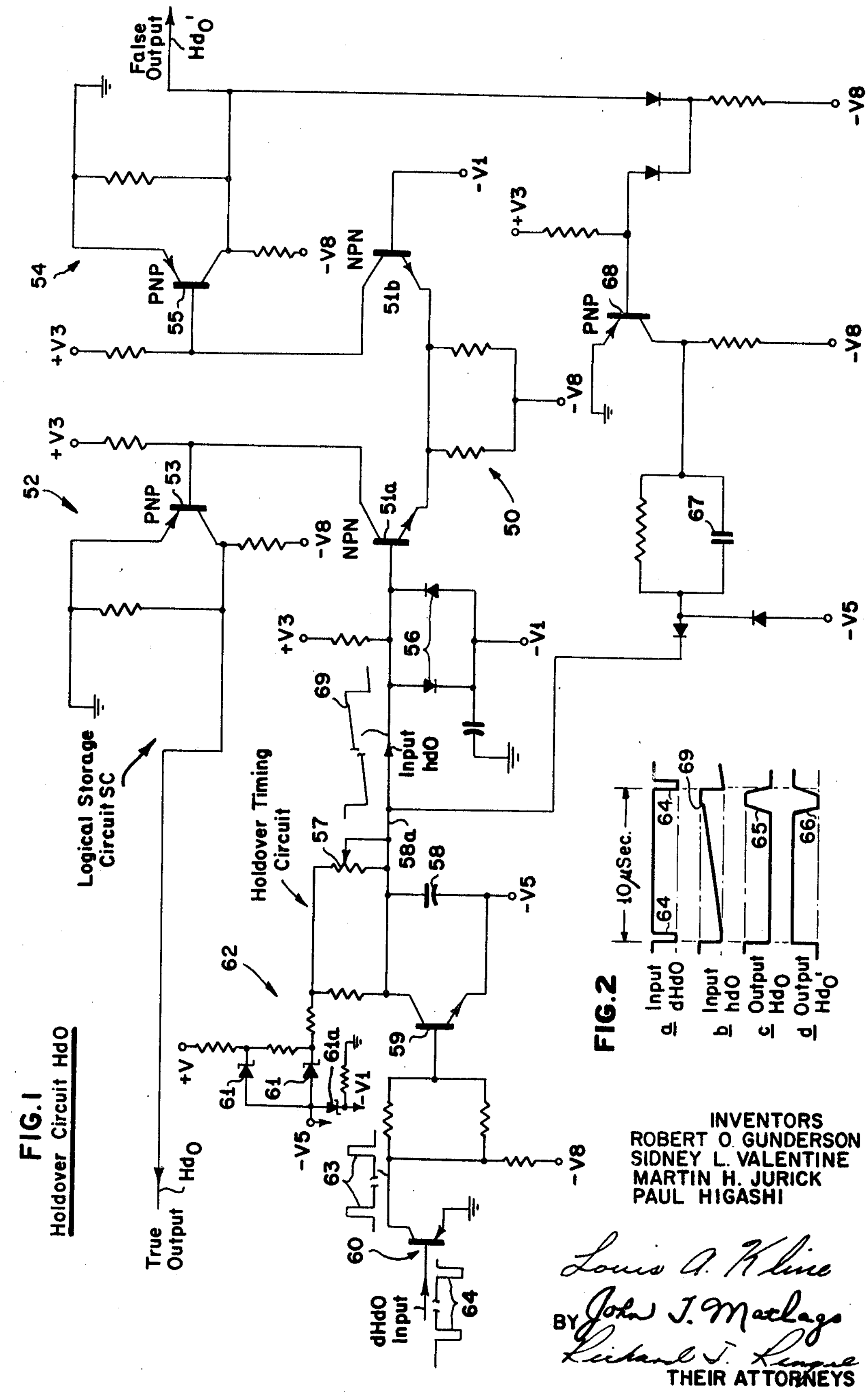

This is a division of copending U.S. application Ser. No. 426,105, filed Jan. 18, 1965 now Pat. No. 3,426,328.

Briefly, the present invention is directed to solid state electronic circuits and provides improved operation for precise time delay in the return of a circuit to a predetermined one of alternate states and more particularly in the range of short time delay intervals, e.g., 4 to 17 microseconds time delay. Further, the present invention provides this improved operation in the presence of noise and under conditions of relatively poor regulation of voltage supply. In addition, the present invention provides faster and more reliable circuit operation and improved output signal waveforms and rise times.

An object of the present invention is to provide an improved holdover circuit having the foregoing features and advantages.

Other objects and features of the invention will become apparent to those skilled in the art as the disclosure is made in the following detailed description of a preferred embodiment of the invention as illustrated in the accompanying sheet of drawing in which:

FIG. 1 is a detailed circuit diagram of the holdover circuit of the present invention; and FIG. 2 is a timing diagram showing typical waveforms produced in the operation of the holdover circuit to illustrate its operation.

The holdover circuit H*d*0, as shown in FIG. 1, includes a holdover timing circuit and logical storage circuit SC wherein the output 58*a* of the holdover timing circuit is coupled to single input *hd*0 of the logical storage circuit SC to provide complementary high and low logical level outputs $Hd_0$ and $Hd_0'$ as shown by the timing diagram in FIG. 2. The time delay of output pulses 65 and 66 (FIGS. 2*c* and 2*d*) is provided from the time any one of the negative pulses 64 is applied to the single logical input *d*H*d*0. More particularly, the time period of delay begins at the trailing edge of each pulse 64.

Referring now to FIG. 1 for a detailed description of the holdover circuit shown therein, the holdover timing circuit is shown to include a charging network which comprises an adjustable resistor 57 and a compensating voltage supply source 62 connected to a capacitor 58 for precise regulation of the time required to charge the capacitor 58, i.e., for any setting of the adjustable resistor 57, the time required to charge capacitor 58 does not vary. As shown, the compensating voltage supply 62 includes Zener diodes 61 connecting the series voltage dropping resistors to the voltage tap —V5. This same voltage tap —V5 is also connected to the lower side of capacitor 58 (and also to the emitter of transistor 59) which is shown by another voltage point —V5 in FIG. 1. Further, the voltage applied to tap —V1, which is shown connected to diodes 56 in FIG. 1, is supplied by the same voltage supply 62 via Zener diode 61*a*. As a result, precise voltage regulation is provided for charging the capacitor 58 even though voltages at sources +V and tap —V5 vary slightly but in the same manner, i.e., due to current load and temperature variation. Due to the fact that the voltage tap —V5 is connected as described, the maximum uncompensated variation of the resistor 57 has been found to be less than 1.12%. The desired variation in the time delay of the holdover circuit H*d*0 over the range provided by the capacitor 58 is provided by the adjustable resistor 57 wherein decreasing the resistance thereof decreases the charging time of capacitor 58, and also the time delay required to return the holdover timing circuit output 58*a* to a high logical level. Normally, this output 58*a* is considered to be at the high logical level as provided by the voltage at the collector of transistor 59 during cut-off which is also the voltage across the fully charged capacitor 58. The range of the period of time delay is changed by providing a selected capacitor 58 of the proper value wherein a large capacitor 58 provides for a range of time delay for longer time periods and the variation of the time delay within the range of the selected capacitor 58 is controlled by the adjustable resistor 57. A typical range of time periods of delay of the timing circuit is from 4 to 17 microseconds for the large capacitor 58, the adjustable resistor being provided primarily to vary the charging rate and thereby control the time delay within the range of the time period of delay of the capacitor 58, including adjustment for component variations of the holdover timing circuit and other circuits coupled thereto.

In order to provide fast and reliable operation of the holdover circuit H*d*0 in the range of time periods being discussed, the false output $Hd_0'$ is coupled back to the input *hd*0 by a feedback circuit including a transistor 68, as shown in FIG. 1. This feedback circuit provides for fast transition of the signal at input *hd*0 (FIG. 2*b*) through the critical threshold region 69 (FIG. 2*a*) of transistor 51*a*. When the signal passes through this threshold region, transistor 51*a* is "turned-on" which changes the state of the holdover H*d*0 from a true state to a false state to produce pulses 65 and 66 (FIGS. 2*c* and 2*d*) at the respective outputs $Hd_0$ and $Hd_0'$. Accordingly, it is important that the rise in voltage of the signal at input *hd*0 continue to rise until it passes through threshold region 69 and "turn-on" transistor 51*a* without delay. In operation, the signal at the input *hd*0 is a rising voltage ramp which is applied thereto by capacitor 58. When in the threshold region 69, the voltage level causing the transistor 51*a* to turn-on is critical and even a slightly lower voltage level of capacitor 58 will not turn-on transistor 51*a*. Accordingly, a positive feedback during the transition period would assure proper operation.

On the other hand, without the feedback current this circuit would be susceptible to noise in that noise can cause spurious "turning-on" of transistor 51*a* when in the threshold region 69. The present feedback circuit avoids this problem by producing an abrupt change rather than a gradual change in voltage level of the signal at the output H*d*0 when the signal voltage reaches the threshold region. Thus, when the signal voltage rises to the threshold region and transistor 51*a* starts to "turn-on," the differential amplifier produces a rise in voltage at the base of transistor 55 causing it to start to turn-off (go out of the state of saturation). When transistor 55 starts to turn-off, the collector voltage decreases and the feedback circuit transistor 68 starts to "turn-on." As the transistor 68 starts to "turn-on," it supplies current to transistor 51*a* via feedback circuit capacitor 67. The transition through the threshold voltage region of the transistor is caused to be an abrupt change as shown in FIG. 2*c* rather than a gradual change as would be the case without the feedback circuit. Accordingly, the operation of the transistor 51*a* and the change of the state of the holdover H*d*0 is fast and reliable in providing the precise time delay required, e.g., for synchronization of a processor with the operation of peripheral equipment at the operating rate determined by the time period of delay of holdover H*d*0.

The logical storage circuit SC is shown to comprise a differential amplifier 50 including a pair of NPN transistors 51*a* and 51*b*; and true and false output stages 52 and 54 including PNP transistors 53 and 55, respectively. In differential amplifier circuit 50, the logical signal voltage appearing at the input *hd*0 is compared to a reference voltage—V1 applied to terminals on both sides of the differential amplifier 50 as shown. Input signals are applied to the base of differential amplifier transistor 51*a* via single input *hd*0, while the base of differential transistor 51*b* receives a constant reference voltage—V1 as its input.its input. In operation, both of the differential amplifier transistors 51*a* and 51*b* are maintained in the active region of operation but only one of the transistors 51*a* or 51*b* will be conducting a large amount, causing the respective one of the output transistors 53 or 55 to be "turned-on" to provide a high logical level signal at its output and a low logical level signal at the output of the other output transistor. The output transistors 53 and 55 are in either of two states; that is, "saturated" or "cut-off." When one of the output transistors 53 or 55 is "saturated," the output voltage thereof is raised to the collector-emitter voltage drop of the respective transistor (i.e., approximately 0 volts). When the other one of the transistors 53 or 55 is in the "cut-off" state, the resistor-voltage divider network determines the output voltage level at —3 volts, for example.

For the purpose of explaining the operation, it is assumed that the logical storage circuit SC is initially in a false state whereupon a low logical level signal is shown applied to the single input *hd*0 to place the storage circuit SC in the true state to thereby provide a low logical level signal at output $Hd_0$ and a high logical level signal at output $Hd_0'$. The low logical level signal at single input *hd*0 causes a large decrease in collector current of transistor 51*a* which raises the voltage at its collector and at the base of transistor 53. In response to the higher voltage at its base, a reverse bias is produced across its base-emitter junction of transistor 53 forcing it into the "cut-off" state, thereby lowering the voltage at the collector and the true output $Hd_0$ to the low logical level (—3 volts).

At the same time as transistor 51*a* is forced to conduct very little current as a result of the large decrease in collector current, the differential transistor 51*b* is caused to conduct a large amount of current which lowers the voltage at its collector to produce a forward bias across the base-emitter junction of transistor 55 causing the output transistor 55 to conduct and go into saturation, thereby raising its collector voltage and the voltage at the false ouput $Hd_0'$ to the high logical level (0 volts). In the foregoing manner, complementary high and low logical level signals are provided at the true and false outputs in response to the low logical level signals applied to the single input *hd*0.

In response to a high logical level signal applied to the single input *hd*0, the differential amplifier transistor 51*a* conducts a large amount of current to lower the voltage to provide a forward bias across the base-emitter junction of output transistor 53 causing it to "turn-on" whereby its collector voltage and the voltage at the true output $Hd_0$ is raised to the high logical level. The complementary low logical level is produced at the false output $Hd_0'$ as the transistor 55 is forced into "cut-off" when transistor 51*b* is caused to conduct very little current in response to transistor 51*a* conducting a high amount of current.

In order to provide for a large number of logical circuits to be coupled to the single input *hd*0 (high "fan in"), the input circuit includes a clamping circuit including diodes 56 connecting the base thereof to the reference voltage —V1 to provide upper and lower clamping of the voltage at the base of transistor 51*a*. This clamping circuit prevents the base of transistor 51*a* from varying more than the diode forward voltage drop, above and below the reference voltage —V1. Also, because of the large number of logical circuit inputs and the input capacity associated therewith, it is desirable to maintain the logical current high, for example, 3 milliamperes. Under these conditions, there is a provision for a current of approximately 1 milliampere in either one or the other of the two diodes 56 and any noise coupled to the single input *hd*0 must be larger than this current before it can affect the state of the differential amplifier transistor 51*a*.

Considering now the overall operation of the holdover timing circuit, each of the negative input pulses 64 applied to the input *d*H*d*0 causes transistor 60 to "turn-on" to produce positive pulses 63. Each of these positive pulses 63 is coupled to the base of transistor 59 causing this transistor to "turn-on." Each time the transistor 59 is "turned-on," the previously charged capacitor 58 is discharged through the transistor 59. At the end of each positive pulse 63, transistor 59 is "turned-off" and capacitor 58 is charged at a time rate determined primarily by the adjustable resistor 57. In the timing diagram of FIG. 2, the input *hd*0 illustrates the discharge of capacitor 58 in response to each of the positive pulses 63 and the charging rate for producing a 10-microsecond pulse rate at the outputs $Hd_0$ and $Hd_0'$. As a result of the foregoing, each of the negative pulses 64 causes the holdover H*d*0 to produce pulses 65 and 66 at outputs $Hd_0$ and $Hd_0'$, respectively, and providing an inhibiting high logical level signal at output $Hd_0'$ between pulses 66.

In accordance with the exemplary operation, the system operating cycles of the processor are synchronized to the rate of pulses at the output $Hd_0'$ whenever a certain one of the program control signals is provided for input/output operation of the processor at the synchronized rate. During the time period between pulses 66, therefore, the initiation of a system operating cycle of the processor by a clock pulse is inhibited by the high logical level signal at output $Hd_0'$ to provide synchronous operation of the processor with 100 kc. peripheral equipment at 10-microsecond time intervals, for example. Thus, synchronized operation of the processor and particular peripheral equipment (not shown) is provided at the 10-microsecond rate (e.g., 100 kc.) of the peripheral equipment whenever required as controlled by a program control signal.

In light of the above teachings, various modifications and variations of the present invention are contemplated and will be apparent to those skilled in the art without departing from the spirit and scope of the invention.

What is claimed is:

1. A logical circuit for timing of circuit output conditions having a first normal condition wherein a high logical signal input level provides complementary high and low logical output levels respectively at true and false output stages, and having a second condition wherein a low logical signal pulse input will invert the output levels at the true and false output stages for an adjustably predetermined time period after the trailing edge of said low logical signal pulse input, and the true and false output stages will return to the normal output level condition, precisely upon termination of said predetermined time period, comprising, in combination: a timing control circuit including a charging network to charge a timing capacitor, and a transistor controlled discharge means to discharge said timing capacitor, said discharge means being responsive to an input signal level, a logical storage circuit responsive to the output of said timing control circuit and comprising a differential amplifier and true and false output stages, said differential amplifier including first and second transistor stages having a first input coupled to said timing control circuit and a second input coupled to a reference potential, said true and false output stages including third and fourth transistors of opposite polarity type and having true and false output lines, said first and second transistors having their collectors respectively connected to the bases of said third and fourth transistors, and a feedback circuit connected from the collector of said false output stage to the first input of said differential amplifier and including a feedback transistor and capacitor.

2. A logical circuit as defined in claim 1 wherein said timing control circuit comprises a Zener diode controlled voltage charging network including an adjustable resistor and capacitor connected in series, a discharge transistor having an emitter and collector connected across said capacitor, and having a base coupled to a signal input inverting circuit, said discharge transistor being responsive to an input pulse so as to discharge said capacitor and produce a low level signal at the output of said timing control circuit and at the first input to the said differential amplifier.

3. A logical circuit as defined in claim 1 in which said feedback circuit operates as a positive feedback from the said false output stage to the output of the timing control circuit and to the first input to the said differential amplifier so as to provide a precise and positive voltage change in the threshold region of the first transistor of said differential amplifier to thereby switch said transistor into a state of saturated conduction.

4. A logical circuit as defined in claim 1 wherein the said predetermined time period is precisely adjustable within the range of 4 to 17 microseconds.

References Cited

UNITED STATES PATENTS

| | | | |
|---|---|---|---|
| 2,845,548 | 7/1958 | Sillman et al. ---- | 307—293 XR |
| 2,892,101 | 6/1959 | Bright ---------- | 307—293 XR |
| 3,073,972 | 1/1963 | Jenkins ---------- | 328—55 XR |
| 3,165,648 | 1/1965 | Sainsbury ---------- | 307—293 |

FOREIGN PATENTS

| | | |
|---|---|---|
| 896,463 | 5/1962 | Great Britain. |

DONALD D. FORRER, Primary Examiner

S. T. KRAWCZEWICZ, Assistant Examiner

U.S. Cl. X.R.

328—55, 67, 129